US012681986B2

(12) United States Patent
Maeda

(10) Patent No.: US 12,681,986 B2
(45) Date of Patent: Jul. 14, 2026

(54) INFORMATION PROCESSING DEVICE, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventor: Eiichi Maeda, Asaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 18/386,876

(22) Filed: Nov. 3, 2023

(65) Prior Publication Data

US 2024/0193205 A1 Jun. 13, 2024

(30) Foreign Application Priority Data

Dec. 9, 2022 (JP) ................................. 2022-196960

(51) Int. Cl.
    *G06F 16/632* (2019.01)
    *G10L 15/22* (2006.01)

(52) U.S. Cl.
    CPC ............ *G06F 16/632* (2019.01); *G10L 15/22* (2013.01); *G10L 2015/223* (2013.01)

(58) Field of Classification Search
    CPC . G06F 16/632; G10L 15/22; G10L 2015/223;

G10L 15/00; G10L 2015/225; G11B
31/003; H04M 1/724098; H04M 1/72442;
H04W 4/40; H04R 2499/13
See application file for complete search history.

(56) References Cited

U.S. PATENT DOCUMENTS

| | | | | |
|---|---|---|---|---|
| 2006/0109970 A1* | 5/2006 | Shim | ........................ | H04M 3/02 |
| | | | | 379/207.16 |
| 2013/0262118 A1* | 10/2013 | Saeki | ..................... | G05B 15/02 |
| | | | | 704/260 |
| 2014/0195527 A1* | 7/2014 | Kim | .................. | G06F 16/24575 |
| | | | | 707/723 |
| 2015/0256674 A1* | 9/2015 | Iwasaki | ................. | G06F 1/1694 |
| | | | | 455/414.1 |
| 2016/0134581 A1* | 5/2016 | Chang | ................. | H04L 12/1813 |
| | | | | 709/206 |
| 2016/0212254 A1* | 7/2016 | Akama | ............... | H04M 1/6091 |
| 2020/0012675 A1 | 1/2020 | Ye et al. | | |
| 2022/0391440 A1* | 12/2022 | Tange | ..................... | G10L 13/08 |

FOREIGN PATENT DOCUMENTS

| | | |
|---|---|---|
| JP | 2006-285416 A | 10/2006 |
| JP | 2020-8854 A | 1/2020 |

* cited by examiner

*Primary Examiner* — Phung-Hoang J Nguyen
(74) *Attorney, Agent, or Firm* — Sughrue Mion, PLLC

(57) ABSTRACT

An information processing device includes a controller. The controller is configured to execute acquiring an utterance of a user, searching for a first music piece on a plurality of sound sources in response to the utterance of the user including a request to replay the first music piece, and replaying the first music piece that has been searched for and is provided in a first sound source.

14 Claims, 4 Drawing Sheets

INFORMATION PROCESSING DEVICE, INFORMATION PROCESSING METHOD, AND NON-TRANSITORY STORAGE MEDIUM

CROSS-REFERENCE TO RELATED APPLICATION

This application claims priority to Japanese Patent Application No. 2022-196960 filed on Dec. 9, 2022, incorporated herein by reference in its entirety.

BACKGROUND

1. Technical Field

The present disclosure relates to an information processing device, an information processing method, and a non-transitory storage medium.

2. Description of Related Art

It is known to replay a music piece stored in a navigation system of a vehicle based on a user's utterance (see, for example, Japanese Unexamined Patent Application Publication No. 2006-285416).

SUMMARY

The present disclosure provides an information processing device, an information processing method, and a non-transitory storage medium that can increase the possibility of replaying a music piece requested by a user.

A first aspect of the present disclosure relates to an information processing device including a controller. The controller may be configured to execute acquiring an utterance of a user, searching for a first music piece on a plurality of sound sources in response to the utterance of the user including a request to replay the first music piece, and replaying the first music piece that has been searched for and is provided within a first sound source.

In the information processing device according to the first aspect, the controller may be configured to search for the first music piece among the sound sources in a predetermined order when searching for the first music piece on the sound sources.

In the first aspect, the controller may be configured to, when searching for the first music piece on the sound sources, search for the first music piece among the sound sources, with priority given to a sound source that provides a music piece that is currently being replayed when searching for the first music piece on the sound sources.

In the first aspect, the sound sources may include a second sound source configured to provide a music piece via wireless communication from outside a vehicle, and a third sound source configured to provide a music piece from a storage device storing the music piece inside the vehicle. The controller may be configured to search for the first music piece among the sound sources, with priority to the third sound source, when searching for, inside the vehicle, the first music piece on the sound sources.

In the first aspect, the sound sources may include a sound source available for a fee, and a sound source available free of charge. The controller may be configured to search for the first music piece among the sound sources, with priority given to the sound source that is available free of charge.

In the first aspect, the sound sources may include a sound source configured to provide a music piece via wireless communication from outside a vehicle, and a sound source configured to provide a music piece from a storage device storing the music piece inside the vehicle.

In the first aspect, the sound source configured to provide the music piece via wireless communication from outside the vehicle may include a sound source configured to stream a music piece via wireless communication from outside the vehicle.

A second aspect of the present disclosure relates to an information processing method executed by a computer. The processing method includes, acquiring an utterance of a user, searching for a first music piece on a plurality of sound sources in response to the utterance of the user including a request to replay the first music piece, and replaying the first music piece that has been searched for and is provided within a first sound source.

In the second aspect, in the searching for the first music piece on the sound sources, the first music piece may be searched for among the sound sources in a predetermined order.

In the second aspect, in the searching for the first music piece on the sound sources, the first music piece may be searched for among the sound sources, with priority given to a sound source that provides a music piece that is currently being replayed.

In the second aspect, the sound sources may include a second sound source configured to provide a music piece via wireless communication from outside a vehicle, and a third sound source configured to provide a music piece from a storage device storing the music piece inside the vehicle. In the searching for the first music piece on the sound sources, the first music piece is searched for, inside the vehicle, among the sound sources, with priority given to the third sound source.

In the second aspect, the sound sources may include a sound source available for a fee, and a sound source available free of charge. In the searching for the first music piece on the sound sources, the first music piece is searched for among the sound sources, with priority given to the sound source that is available free of charge.

In the second aspect, the sound sources may include a sound source configured to provide a music piece via wireless communication from outside a vehicle, and a sound source configured to provide a music piece from a storage device storing the music piece inside the vehicle.

In the second aspect, the sound source configured to provide the music piece via wireless communication from outside the vehicle may include a sound source configured to stream a music piece via wireless communication from outside the vehicle.

A third aspect of the present disclosure relates to a non-transitory storage medium storing instructions that are executable by a computer and that cause the computer to perform functions. The functions include, acquiring an utterance of a user, searching for a first music piece on a plurality of sound sources in response to the utterance of the user including a request to replay the first music piece, and replaying the first music piece that has been searched for and is provided in a first sound source.

In the third aspect, in the searching for the first music piece on the sound sources, the first music piece may be searched for among the sound sources in a predetermined order.

In the third aspect, in the searching for the first music piece on the sound sources, the first music piece may be searched for among the sound sources, with priority given to a sound source that provides a music piece that is currently being replayed.

In the third aspect, the sound sources may include a second sound source configured to provide a music piece via wireless communication from outside a vehicle, and a third sound source configured to provide a music piece from a storage device storing the music piece inside the vehicle. In the searching for the first music piece on the sound sources, the first music piece is searched for, inside the vehicle, among the sound sources, with priority given to the third sound source.

In the third aspect, the sound sources may include a sound source available for a fee, and a sound source available free of charge. In the searching for the first music piece on the sound sources, the first music piece is searched for among the sound sources, with priority given to the sound source that is available free of charge.

In the third aspect, the sound sources may include a sound source configured to provide a music piece via wireless communication from outside a vehicle, and a sound source configured to provide a music piece from a storage device storing the music piece inside the vehicle.

With each aspect of the present disclosure, it is possible to increase the possibility that a song requested by a user can be replayed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A technology is known that replays a music piece stored in a navigation system of a vehicle based on a user's utterance. However, when a music piece desired by the user is not stored in the navigation system, the music piece cannot be replayed. Therefore, the information processing device according to the present disclosure includes a controller to execute acquiring an utterance of a user, searching for a first music piece on a plurality of sound sources in response to the utterance of the user including a request to replay the first music piece, and replaying the first music piece, which has been searched for and is provided within a first sound source.

The controller acquires the user's utterance, for example, through a microphone. The request to replay the first music piece may be, for example, a request specifying a music name, a singer name, a group name, a genre, an album name, a playlist name, or the like. The controller searches for the first music piece requested by the user among the sound sources. A sound source is a device capable of providing music piece data, and includes, for example, a storage device such as a USB flash drive (USB memory), a mobile terminal equipped with a storage device, a server on the Internet, and the like. Also, the server on the Internet may be, for example, a server managed by a content provider that provides music distribution services. There may be a plurality of servers.

Searching for the first music piece among the sound sources increases the probability of finding the first music piece requested by the user. Then, by acquiring and replaying a music piece from the first sound source, it is possible to replay the music piece that meets the user's request. In this way, it is possible to prevent the music piece from being unplayable.

An embodiment of the present disclosure will be described below based on the drawings. The configuration of the following embodiment is an example, and the present disclosure is not limited to the configuration of the embodiment.

First Embodiment

Figure 1:
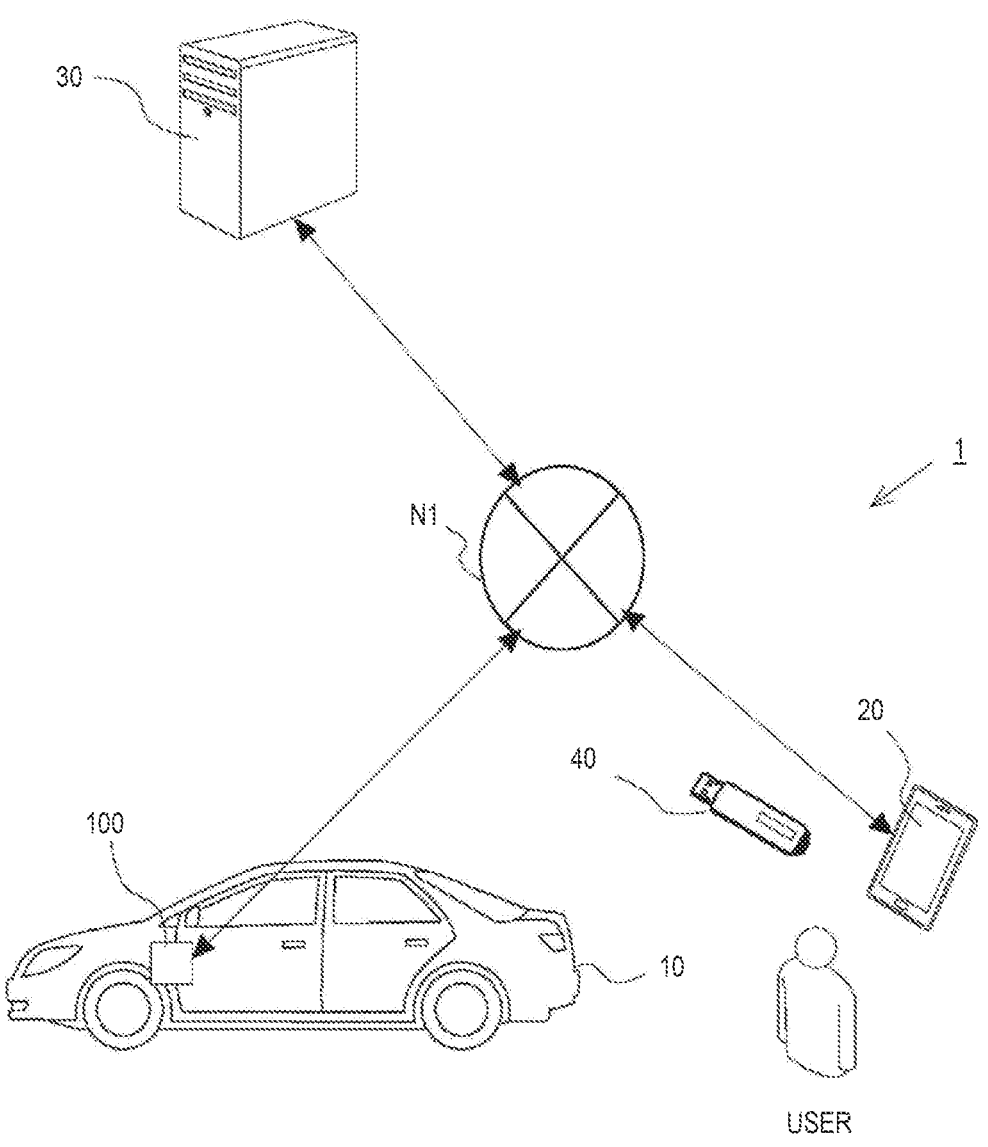
FIG. 1 is a diagram illustrating a schematic configuration of a system according to an embodiment.

FIG. 1 is a diagram illustrating a schematic configuration of a system 1 according to an embodiment. In an example of FIG. 1, the system 1 includes an in-vehicle device 100 mounted on a vehicle 10, a user terminal 20 owned by a user of the vehicle 10, a music server 30, and a USB memory 40. The music server is an example of a second sound source. The user terminal 20 and the USB memory 40 are examples of a third sound source and storage device.

The in-vehicle device 100 includes, for example, a navigation system or a multi-information display (MID). The in-vehicle device 100 replays a music piece in response to a request from a user. The in-vehicle device 100 can, for example, search for a music piece on the user terminal 20, the USB memory 40, and the Internet. It is not necessary to search for all of them.

The user terminal 20 is a terminal possessed by the user, and can store a music piece, for example. Also, the user terminal 20 can provide a music piece to the in-vehicle device 100 by connecting it by wire or wirelessly. The user terminal 20 can also download a music piece from the music server 30 via the Internet, for example.

The music server 30 is, for example, a server that provides a music piece for a fee or free of charge via the Internet. A plurality of music servers 30 may exist. The music servers 30 are managed by different content providers. The music server 30 streams music pieces, for example. Music pieces may be downloaded from the music server 30 and stored in the in-vehicle device 100. The in-vehicle device 100 can access one or more music servers 30. The user may perform user registration with the music server 30 in advance.

The in-vehicle device 100 searches for and replays the music piece when the user utters a request to replay the music piece. When searching for the music piece, the in-vehicle device 100 preferentially searches a sound source (hereinafter, also referred to as an active sound source) that provides data of a music piece that is currently being replayed among a plurality of sound sources. For example, when a music piece currently stored in the USB memory 40 is being replayed, if the user requests to replay another music piece, first, the music piece is searched for in the USB memory 40. When the requested music piece is not stored in the USB memory 40, another sound source (for example, the music server 30) is searched. Here, the user may feel discomfort when the sound source is changed between the currently replayed music piece and the music piece requested by the user. Therefore, by acquiring music piece data from the same sound source and replaying it, it is possible to avoid any discomfort that the user may experience. However, it is conceivable that the music piece data requested by the user does not exist in the active sound source. In such a case, searching through alternative sound sources can prevent the music piece from becoming unplayable.

The in-vehicle device 100, the user terminal 20, and the music server 30 are interconnected through a network N1. The network N1 is, for example, a worldwide public communication network such as the Internet, and may be a wide area network (WAN) or other communication network. The network N1 may also include a telephone communication network such as a mobile phone, or a wireless communication network such as Wi-Fi (registered trademark). Although one music server 30 is exemplarily illustrated in FIG. 1, a plurality of music servers 30 may exist. Also, the in-vehicle device 100 and the user terminal 20 may be capable of short-range wireless communication, or may be connectable by wire.

Figure 2:
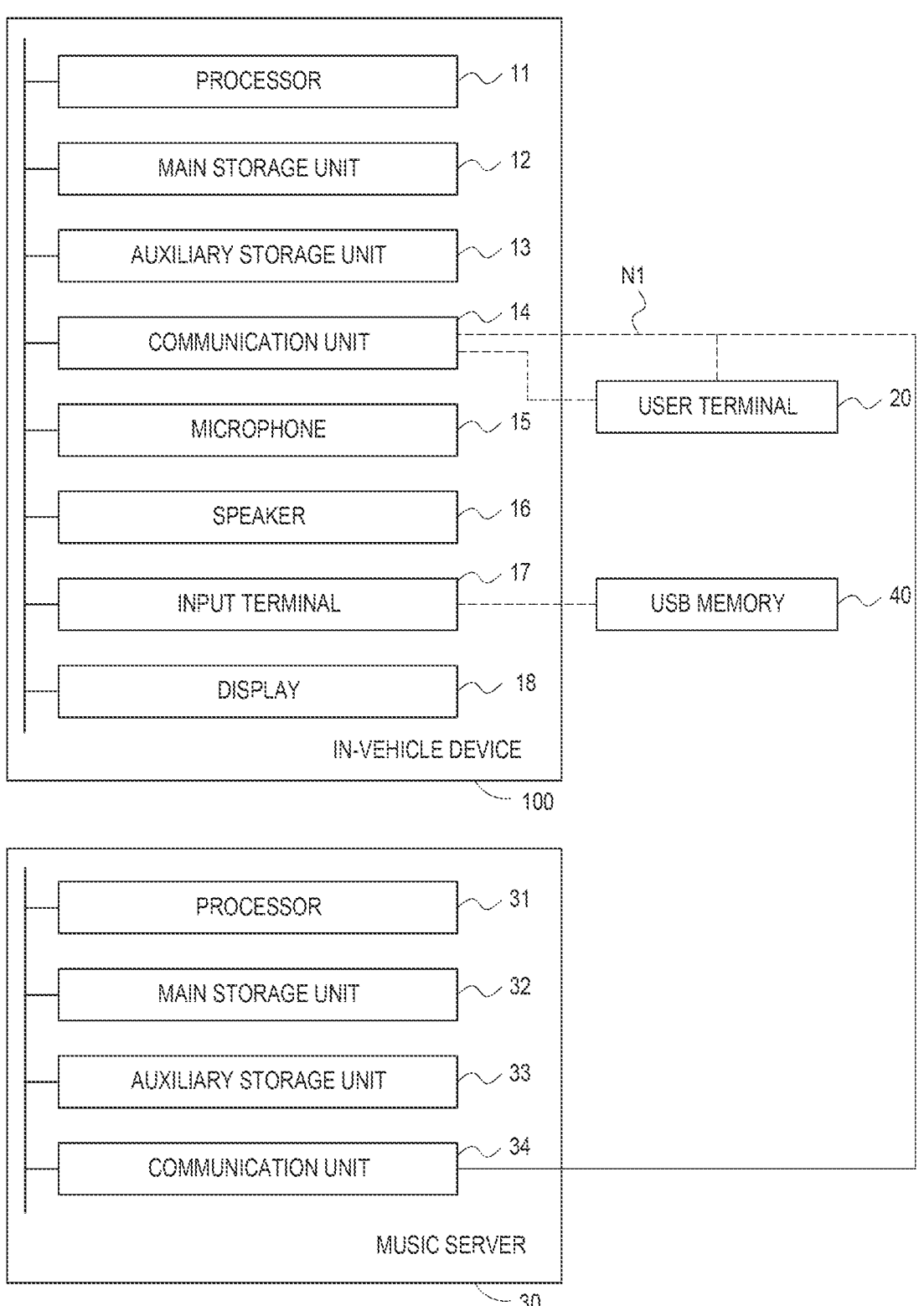
FIG. 2 is a block diagram schematically illustrating an example of each configuration of an in-vehicle device and a music server that form the system according to the embodiment.

Next, hardware configurations of the in-vehicle device 100 and the music server 30 will be described with reference to FIG. 2. FIG. 2 is a block diagram schematically illustrating an example of each configuration of the in-vehicle device 100 and the music server 30 that form the system 1 according to the embodiment.

The in-vehicle device 100 has a computer configuration. The in-vehicle device 100 has a processor 11, a main storage unit 12, an auxiliary storage unit 13, a communication unit 14, a microphone 15, a speaker 16, an input terminal 17, and a display 18. These are interconnected through a bus. The processor 11 is an example of a controller.

The processor 11 is a central processing unit (CPU), a digital signal processor (DSP), or the like. The processor 11 controls the in-vehicle device 100 and performs various information processing operations. The main storage unit 12 is a random access memory (RAM), a read only memory (ROM), or the like. The auxiliary storage unit 13 is an erasable programmable ROM (EPROM), a hard disk drive (HDD), removable media, or the like. The auxiliary storage unit 13 stores an operating system (OS), various programs, various tables, and the like. The processor 11 loads the program stored in the auxiliary storage unit 13 into a work area of the main storage unit 12 and executes it, and through the execution of this program, each component or the like is controlled. As a result, the in-vehicle device 100 realizes a function that meets a predetermined purpose. The main storage unit 12 and the auxiliary storage unit 13 are computer-readable recording media.

The communication unit 14 serves as a means of connecting the in-vehicle device 100 to the network N1. Also, the communication unit 14 serves as a means of performing short-range wireless communication with the user terminal 20. The communication unit 14 serves as a circuit of communicating with other devices (for example, user terminal 20, music server 30, or the like) using a wireless communication network such as a mobile communication service (for example, telephone communication networks such as 6th Generation (6G), 5th Generation (5G), 4th Generation (4G), 3rd Generation (3G), long term evolution (LTE)), Wi-Fi (registered trademark), Bluetooth (registered trademark) Low Energy, near field communication (NFC), ultra wideband (UWB), and the like.

The microphone 15 is a device used to input sound. The sound input to the microphone 15 includes the user's voice. The speaker 16 is a device that outputs sound. Sound includes music pieces. The input terminal 17 is an interface for connecting external equipment. The input terminal 17 includes, for example, a USB terminal and an AUX terminal. The USB memory 40 can be inserted into the USB terminal. The USB memory 40 is a USB flash drive, a storage device having a USB connector and a flash memory chip. The display 18 serves as a means of presenting information to the user, and includes, for example, a liquid crystal display (LCD) or an electroluminescence (EL) panel.

The music server 30 has a computer configuration. The music server 30 has a processor 31, a main storage unit 32, an auxiliary storage unit 33, and a communication unit 34. These are interconnected through a bus. The processor 31, main storage unit 32, auxiliary storage unit 33, and communication unit 34 of the music server 30 are similar to the processor 11, main storage unit 12, auxiliary storage unit 13, and communication unit 14 of the in-vehicle device 100, so description thereof will be omitted.

The user terminal 20 is, for example, a small computer such as a smart phone, a mobile phone, a tablet terminal, a personal information terminal, a wearable computer (such as a smartwatch), or a personal computer (PC). The user terminal 20 has a similar processor, main storage unit, auxiliary storage unit, and communication unit as those of the in-vehicle device 100. The user terminal 20 can store music pieces in the auxiliary storage unit.

Figure 3:
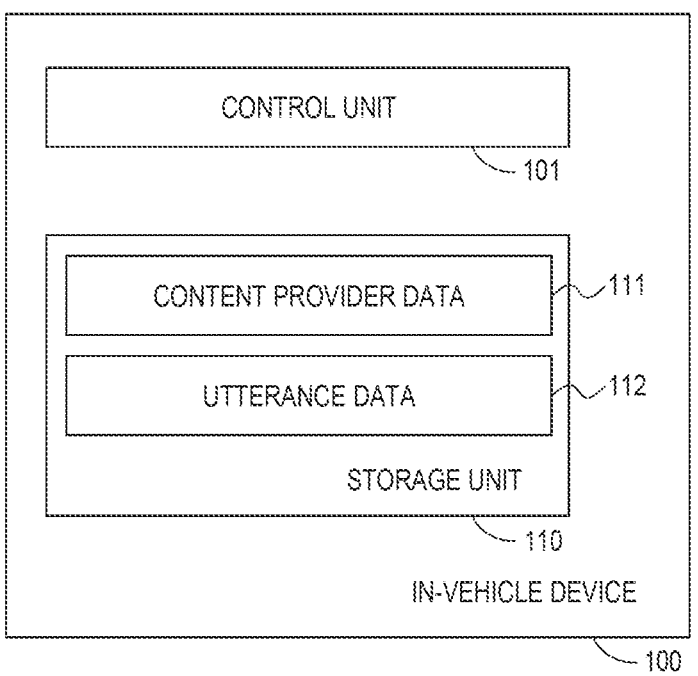
FIG. 3 is a diagram illustrating a functional configuration of the in-vehicle device.

Next, functions of the in-vehicle device 100 will be described. FIG. 3 is a diagram exemplifying the functional configuration of the in-vehicle device 100. The in-vehicle device 100 includes a controller 101 and a storage unit 110 as functional components. The processor 11 of the in-vehicle device 100 executes processing of the controller 101 according to a computer program on the main storage unit 12. However, any one of the functional components or part of its processing may be executed by a hardware circuit.

The storage unit 110 includes the main storage unit 12 and the auxiliary storage unit 13. The storage unit 110 stores content provider data 111 and utterance data 112.

The content provider data 111 is data relating to content providers available to the user or content providers for which user registration has been completed. The content provider data 111 includes information on the music server 30 and information on user registration. The information on the music server 30 includes, for example, information on the uniform resource identifier (URI) of the music server 30 and information on whether it can be used free of charge. Whether the music piece can be used for free may be determined based on whether it is necessary to pay a fee when replaying the music piece. For example, when the user pays a flat fee in advance and does not need to pay the fee when replaying the music piece, it may be considered that the usage is free of charge. The information on user registration includes, for example, information on a user ID and a password that are required to acquire music piece data from the music server 30. The user ID and password are entered in the in-vehicle device 100 by the user.

The controller 101 receives a request to replay a music piece from the user via the microphone 15. The controller 101 constantly monitors the user's utterances, and determines that there is a music request when a specific utterance is made. Specific utterances include, for example, "play <1>", "replay <1>", "playback <1>", and the like. <1> corresponds to, for example, a music name, a singer name, a music genre, an album name, a playlist name, and a combination thereof. The utterance data 112 stores information related to utterances made by the user when requesting replay of a music piece. The controller 101 compares the user's utterance with the information stored in the utterance data 112 to determine whether the user has requested to replay the music piece.

Also, the controller 101 specifies the music piece requested by the user. That is, the music piece corresponding to <1> is specified. A known technique can be used to specify the music piece. Also, a machine learning model that inputs the user's utterance and outputs the name of the music piece may be used to specify the music piece. Similarly, a singer name, a music genre, an album name, a playlist name, and the like can also be specified.

Then, the controller 101 searches for the music piece requested by the user. In this case, priority is set for each sound source. For example, the active sound source may have the highest priority. The default sound source may then be set to have a higher priority. The user designates the default sound source, for example.

Hereinafter, the case where the USB memory 40 and one or more music servers 30 can be used as sound sources will be described. For example, when the music piece stored in the USB memory 40 is currently being replayed, if a user requests to replay another music piece, the controller 101 first searches for the music piece on the USB memory 40. Then, when the music piece data is stored in the USB memory 40, the music piece stored in the USB memory 40 is replayed.

On the other hand, when the music piece data is not stored in the USB memory 40, the music server 30 is accessed to search for the music piece. When the music servers 30 are available, priority is set for each of the music servers 30 and the searching is performed in order. For example, the music server 30 that provides a music piece for free may have a higher priority than the music server 30 that provides a music piece for a fee. Also, the music server 30 designated in advance by the user may have a higher priority, or the music server 30 that is used more frequently by the user may have a higher priority. Alternatively, a music piece may be searched from the music servers 30 in alphabetical order based on the names of the music servers 30. In this case, the searching is performed by arranging the names of the content providers in alphabetical order.

Also, for example, when the data of the currently replayed music piece is provided from the music server 30 and the user requests to replay another music piece, first, the controller 101 gives the highest priority to the music server 30 that provides the data of the music currently being replayed. Then, when the music piece is found in the music server 30, the data of the music piece is acquired from the music server 30 and replayed. On the other hand, when the music piece is not found in the music server 30, the music piece is searched for according to the priority. For example, a sound source inside the vehicle 10 may have a higher priority than an external sound source, or a wired sound source may have a higher priority than a wirelessly connected sound source. A sound source wirelessly connected from the outside of the vehicle 10 may cause sound interruption or noise depending on the communication state, so the priority of the sound source inside the vehicle 10 or the sound source connected by wire is increased. In this case, since the USB memory 40 has a higher priority, the USB memory 40 will be used to search for the music piece. When data of the music piece is not stored in the USB memory 40, another music server 30 is used to search for the music piece.

Also, when the user requests to replay the music piece when no music is being replayed at the moment, for example, the default sound source may be given the highest priority. Alternatively, for example, a sound source that can be used for free may be given a higher priority than a sound source that can be used for a fee, or a sound source that is used more frequently by the user may be given a higher priority. Further, for example, a sound source inside the vehicle 10 may have a higher priority than an external sound source, or a wired sound source may have a higher priority than a wirelessly connected sound source.

It is not always necessary to give the active sound source the highest priority. Regardless of the active sound source, the searching may be performed by setting priorities as described above.

Alternatively, the controller 101 may search for the music piece in all available sound sources regardless of priority. Then, for example, a list of sound sources capable of providing the music piece may be displayed on the display 18 included in the in-vehicle device 100. Further, the user may be allowed to select the sound source for replaying the music piece from among them. This selection may be made on the touch panel or by voice.

The controller 101, for example, sends music piece information to the music server 30 when searching for a music piece on the music server 30. The music piece information includes information on a music name, a singer name, a music genre, an album name, a playlist name, and the like. The music server 30 searches for the music piece based on the music piece information. When the music server 30 finds the music piece, data for replaying the music piece is sent to the in-vehicle device 100. The controller 101 streams the music piece based on the data sent from the music server 30.

On the other hand, when the music server 30 cannot find the music piece, information to that effect is sent to the in-vehicle device 100. In this case, information on recommended music pieces or playlists may be sent from the music server 30 to the in-vehicle device 100. When the music piece is not found in all sound sources, the controller 101 may notify that the music piece has not been found by voice from the speaker 16 or display it on the display 18. Also, when the music piece is not found in all sound sources, the controller 101 may replay, for example, a recommended music piece or playlist received from the music server 30 from which the music piece is searched first.

When the user designates a specific sound source in an utterance, a music piece is searched only for that specific sound source, and a music piece is not searched for in other sound sources. For example, when an utterance of "replay <1> by streaming" is acquired, a music piece is searched for in the music server 30 without searching for a music piece in the USB memory 40 and the user terminal 20. Also, it is conceivable that the user does not specify the music piece. For example, <1> corresponds to "content provider name". In this case, music pieces recommended by the specified content provider may be acquired and replayed.

Figure 4:
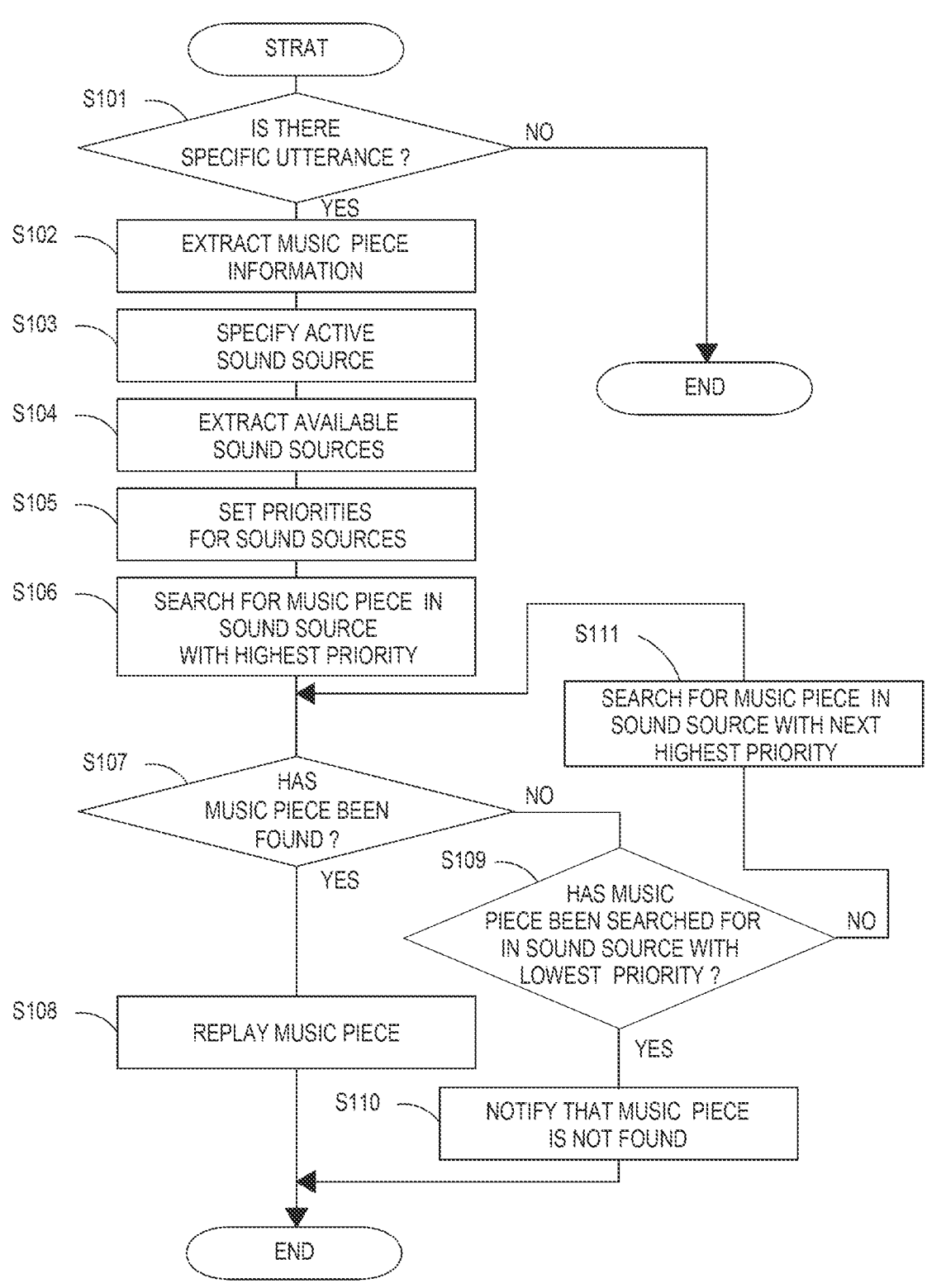
FIG. 4 is a flowchart of music piece replay processing in the in-vehicle device according to the embodiment.

Next, music piece replay processing in the in-vehicle device 100 will be described. FIG. 4 is a flowchart of music piece replay processing in the in-vehicle device 100 according to the embodiment. The processing illustrated in FIG. 4 is executed in the in-vehicle device 100 at predetermined time intervals.

In step S101, the controller 101 determines whether there is a specific utterance. The controller 101 determines whether there is a specific utterance based on the input from the microphone 15. A known speech recognition technique can be used for this determination. For example, the controller 101 determines that a specific utterance has been made when there is an utterance such as "play <1>", "replay <1>", or "playback <1>". When a positive determination is made in step S101, the process proceeds to step S102, and when a negative determination is made, the routine is ended.

In step S102, the controller 101 extracts music piece information. That is, the controller 101 extracts the portion <1>included in the specific utterance determined in step S101. In step S103, the controller 101 specifies a sound source (active sound source) when a music piece is being replayed at the present time. In step S104, the controller 101 extracts sound sources available to the user. The controller 101 extracts available sound sources such as the USB memory 40 connected to the input terminal 17, the user terminal 20 connected by short-range wireless communication, and the music server 30 connectable via the network N1.

In step S105, the controller 101 sets priorities for the sound sources extracted in step S104. For example, the controller 101 gives the highest priority to the active sound source. Then, the priority of the default sound source is increased. In addition, priorities are set in alphabetical order.

In step S106, the controller 101 searches for the music piece corresponding to the music piece information, on the sound source with the highest priority. In step S107, the controller 101 determines whether the music piece has been found. When the determination in step S107 is positive, the process proceeds to step S108, and the controller 101 acquires and replays the data of the music piece found as a result of the searching. In this case, the music piece is not searched for in sound sources with lower priority.

On the other hand, when the determination in step S107 is negative, the process proceeds to step S109, and the controller 101 determines whether the music piece has been searched for in the sound source with the lowest priority. That is, the controller 101 determines whether the music piece has been searched for in all available sound sources. When the determination in step S109 is positive, the process proceeds to step S110, and the controller 101 notifies that the music piece has not been found in any of the sound sources. For example, the user may be notified by voice from the speaker 16 that the music piece is not found. Alternatively, for example, recommended music pieces sent from the music server 30 may be replayed. In this case, for example, it may be notified by voice that the music piece recommended by the music server 30 will be played.

On the other hand, when a negative determination is made in step S109, the process proceeds to step S111, and the controller 101 searches for the music piece on the sound source with the next highest priority. Then, the process returns to step S107.

As described above, according to the embodiment, when searching for the music piece based on the user's utterance, the music piece is searched for among a plurality of sound sources, so the possibility of finding the music piece increases. Also, when searching for the music piece, the music piece is preferentially searched for on the sound source that is currently replaying music pieces. Therefore, it is possible to prevent the sound source from being changed, thus avoiding any discomfort that the user may experience.

Other Embodiment

The above-described embodiment is merely an example, and the present disclosure can be modified as appropriate without departing from the scope of the present disclosure.

The processing and means described in the present disclosure can be freely combined and implemented as long as there is no technical contradiction.

Also, the processing described as being performed by one device may be shared and performed by a plurality of devices. Alternatively, the processing described as being performed by different devices may be performed by one device. In the computer system, it is possible to flexibly change the hardware configuration (server configuration) to realize each function. For example, the music server 30 may have some of the functions of the in-vehicle device 100.

Also, in the above-described embodiment, an example in which the in-vehicle device 100 replays the music piece is described, but as an alternative method, for example, a case in which the user terminal 20 replays the music piece can be similarly applied. For example, when music piece data is stored in an auxiliary storage unit of the user terminal 20, and if the user terminal 20 can acquire the music piece data from the music server 30 via the network N1, for example, the music piece may be searched for according to priority. In this case, the user does not need to be in the vehicle 10.

In the above-described embodiment, the USB memory 40 is used as an example of a medium for storing music piece data, but the medium for storing music piece data is not limited to this. For example, music piece data may be stored in a hard disk drive (HDD), an optical disk (CD-ROM, DVD disk, Blu-ray disk, and the like), and a flash memory card, and the in-vehicle device 100 may read music piece data from these media. In this case, the in-vehicle device 100 has an interface corresponding to each medium.

The present disclosure can also be implemented by supplying a computer program implementing the functions described in the above embodiment to a computer, and reading and executing the program by one or more processors of the computer. Such a computer program may be provided to the computer by a non-temporary computer-readable storage medium connectable to a system bus of the computer, or may be provided to the computer via a network. A non-temporary computer-readable storage medium includes, for example, any type of disk such as magnetic disk (floppy (registered trademark) disk, hard disk drive (HDD), or the like), optical disk (CD-ROM, DVD disk, Blu-ray disk, or the like), a read only memory (ROM), a random access memory (RAM), an EPROM, an EEPROM, a magnetic card, a flash memory, an optical card, and any type of medium suitable for storing an electronic instruction.

What is claimed is:

1. An information processing device, comprising a controller configured to execute:
   acquiring an utterance of a user that includes a request to replay a first music piece;
   in response to the utterance of the user, sequentially searching for the first music piece from a plurality of different sound sources in a predetermined order, wherein a sound source that provides a music piece currently being replayed at a time when the utterance is acquired, has a highest priority among the plurality of different sound sources in the predetermined order and is searched before other ones of the plurality of different sound sources; and
   based upon the first music piece being found in one of the plurality of different sound sources during the sequential searching, stop the sequential searching and start, replaying the first music piece from said one of the plurality of different sound sources.

2. The information processing device according to claim 1, wherein:
   the sound sources include a second sound source configured to provide a music piece via wireless communication from outside a vehicle, and a third sound source configured to provide a music piece from a storage device storing the music piece inside the vehicle; and the controller is configured to search for the first music piece among the sound sources, with priority given to the third sound source before the second source in the predetermined order, when searching for, inside the vehicle, the first music piece on the sound sources.

3. The information processing device according to claim 1, wherein:

the sound sources include a sound source available for a fee, and a sound source available free of charge; and the controller is configured to search for the first music piece among the sound sources, with priority given to the sound source that is available free of charge.

4. The information processing device according to claim 1, wherein the sound sources include a sound source configured to provide a music piece via wireless communication from outside a vehicle, and a sound source configured to provide a music piece from a storage device storing the music piece inside the vehicle.

5. The information processing device according to claim 4, wherein the sound source configured to provide the music piece via wireless communication from outside the vehicle includes a sound source configured to stream a music piece via wireless communication from outside the vehicle.

6. An information processing method executed by a computer, the information processing method comprising:

acquiring an utterance of a user that includes a request to replay a first music piece;

in response to the utterance of the user, sequentially searching for the first music piece from a plurality of different sound sources in a predetermined order, wherein a sound source that provides a music piece currently being replayed at a time when the utterance is acquired, has a highest priority among the plurality of different sound sources in the predetermined order and is searched before other ones of the plurality of different sound sources; and based upon the first music piece being found in one of the plurality of different sound sources during the sequential searching, stop the sequential searching and start, replaying the first music piece from said one of the plurality of different sound sources.

7. The information processing method according to claim 6, wherein:

the sound sources include a second sound source configured to provide a music piece via wireless communication from outside a vehicle, and a third sound source configured to provide a music piece from a storage device storing the music piece inside the vehicle; and in the searching for the first music piece on the sound sources, the first music piece is searched for, inside the vehicle, among the sound sources, with priority given to the third sound source before the second source in the predetermined order.

8. The information processing method according to claim 6, wherein:

the sound sources include a sound source available for a fee, and a sound source available free of charge; and in the searching for the first music piece on the sound sources, the first music piece is searched for among the sound sources, with priority given to the sound source that is available free of charge.

9. The information processing method according to claim 6, wherein the sound sources include a sound source configured to provide a music piece via wireless communication from outside a vehicle, and a sound source configured to provide a music piece from a storage device storing the music piece inside the vehicle.

10. The information processing method according to claim 9, wherein the sound source configured to provide the music piece via wireless communication from outside the vehicle includes a sound source configured to stream a music piece via wireless communication from outside the vehicle.

11. A non-transitory storage medium storing instructions that are executable by a computer and that cause the computer to perform functions comprising:

acquiring an utterance of a user that includes a request to replay a first music piece;

in response to the utterance of the user, sequentially searching for the first music piece from a plurality of different sound sources in a predetermined order, wherein a sound source that provides a music piece currently being replayed at a time when the utterance is acquired, has a highest priority among the plurality of different sound sources in the predetermined order and is searched before other ones of the plurality of different sound sources; and based upon the first music piece being found in one of the plurality of different sound sources during the sequential searching, stop the sequential searching and start, replaying the first music piece from said one of the plurality of different sound sources.

12. The non-transitory storage medium according to claim 11, wherein:

the sound sources include a second sound source configured to provide a music piece via wireless communication from outside a vehicle, and a third sound source configured to provide a music piece from a storage device storing the music piece inside the vehicle; and in the searching for the first music piece on the sound sources, the first music piece is searched for, inside the vehicle, among the sound sources, with priority given to the third sound source before the second source in the predetermined order.

13. The non-transitory storage medium according to claim 11, wherein:

the sound sources include a sound source available for a fee, and a sound source available free of charge; and in the searching for the first music piece on the sound sources, the first music piece is searched for among the sound sources, with priority given to the sound source that is available free of charge.

14. The non-transitory storage medium according to claim 11, wherein the sound sources include a sound source configured to provide a music piece via wireless communication from outside a vehicle, and a sound source configured to provide a music piece from a storage device storing the music piece inside the vehicle.

* * * * *